United States Patent
Chandrasekaran

(10) Patent No.: US 7,581,056 B2
(45) Date of Patent: Aug. 25, 2009

(54) LOAD BALANCING USING DISTRIBUTED FRONT END AND BACK END VIRTUALIZATION ENGINES

(75) Inventor: Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 11/128,025

(22) Filed: May 11, 2005

(65) Prior Publication Data

US 2006/0259680 A1    Nov. 16, 2006

(51) Int. Cl.
G06F 9/455    (2006.01)
G06F 3/06     (2006.01)
G06F 12/00    (2006.01)
G06F 13/00    (2006.01)
G06F 13/28    (2006.01)
G06F 9/26     (2006.01)
G06F 9/34     (2006.01)
G06F 15/16    (2006.01)

(52) U.S. Cl. ............... 711/4; 718/105; 711/141; 711/147; 711/202; 711/203; 711/111; 709/217

(58) Field of Classification Search ............ None
See application file for complete search history.

(56) References Cited

U.S. PATENT DOCUMENTS 6,898,670 B2 *   5/2005   Nahum ............... 711/114
7,020,760 B2 *   3/2006   Glider .............. 711/202
2004/0148376 A1* 7/2004   Rangan et al. ...... 709/223
2004/0153614 A1* 8/2004   Bitner et al. ...... 711/162
2005/0108375 A1* 5/2005   Hallak-Stamler .... 709/223

OTHER PUBLICATIONS

Tanenbaum, "Structured Computer Organization, Third Edition," Section 1.4 Hardware, Software, and Multilevel Machines, p. 11, Hardware and software and logically equivalent., 1990.*
IBM Technical Validations, Ready for IBM Virtualization Engine Introduction, printed from website www-304.ibm.com/jct09002c/isv/tech/validation/virtualization/index.html on Jul. 14, 2006, 2 pages.
Gus Kassimis, "Optimizing External IP Load Balancing in a Sysplex Environment," printed from website www.itindepth.com/GusLoadbalancing.htm on Feb. 3, 2006, 4 pages.
Transmittal Form and International Search Report for PCT Application No. PCT/US06/18009 mailed Sep. 17, 2007.
Written Opinion for PCT Application No. PCT/US06/18009 mailed Sep. 17, 2007.

* cited by examiner

*Primary Examiner*—Sanjiv Shah
*Assistant Examiner*—Marwan Ayash
(74) *Attorney, Agent, or Firm*—Weaver Austin Villeneuve & Sampson LLP

(57) ABSTRACT

Methods and apparatus are provided for improving network virtualization in a storage area network. A virtualization engine is divided into a front end virtualization engine and a back end virtualization engine cluster. The front end virtualization is associated with one or more virtual enclosure ports. The back end virtualization engine cluster performs resource intensive virtual address to physical address mapping. Virtualization engine resources can be dynamically added to a back end virtualization engine cluster while presenting a consistent interface to hosts connected to a storage area network.

26 Claims, 8 Drawing Sheets

LOAD BALANCING USING DISTRIBUTED FRONT END AND BACK END VIRTUALIZATION ENGINES

BACKGROUND OF THE INVENTION

1. Field of the Invention.

The present invention generally relates to storage area networks. More specifically, the present invention provides mechanisms for efficiently and effectively configuring virtualization mechanisms in a fibre channel fabric.

2. Description of Related Art

Virtualization is an abstraction that allows efficient use of resources in a manner transparent to a user. In many storage area networks, virtualization is provided at a host or at a target connected to a storage area network. For endpoint virtualization, a target device may include multiple physical disks that allow data written to the target device to be mirrored and striped across disks in a manner transparent to the host and the user. A host writes data to a disk array and the disk array is responsible for managing redundancy features in a manner transparent to the host. In another example, hosts may be responsible for implementing virtualization. Instead of having an end device perform the redundancy operations, a host can elect to mirror and stripe data across a variety of storage devices in a storage area network in a manner transparent to target devices and the user.

With the emergence of intelligent storage area networks, virtualization is being moved to the network. In some examples, fibre channel switches in a storage area network perform functions associated with mirroring and striping in a manner transparent to the hosts and end devices. However, mechanisms for efficiently and effectively configuring virtualization mechanisms are limited in storage area networks.

It is therefore desirable to provide methods and apparatus for improving the allocation and configuration of storage resources in a network using virtualization.

SUMMARY OF THE INVENTION

Methods and apparatus are provided for improving network virtualization in a storage area network. A virtualization engine is divided into a front end virtualization engine and a back end virtualization engine cluster. The front end virtualization is associated with one or more virtual enclosure ports. The back end virtualization engine cluster performs resource intensive virtual address to physical address mapping. Virtualization engine resources can be dynamically added to a back end virtualization engine cluster while presenting a consistent interface to hosts connected to a storage area network.

In one embodiment, a virtualization engine in a network is provided. The virtualization engine includes a front end virtualization engine and a back end virtualization engine cluster. The front end virtualization engine is configured to receive an input/output (I/O) request from a host. The back end virtualization engine cluster includes multiple back end virtualization engines. One of the back end virtualization engines is selected to perform a virtual to physical lookup for the I/O request to allow forwarding of the I/O request to a selected target.

In another embodiment, a technique for performing network virtualization is provided. An input/output (I/O) request is received from a host at a front end virtualization engine. A back end virtualization engine is selected from a back end virtualization engine cluster. The back end virtualization engine is selected to perform a virtual to physical lookup for the I/O request to allow forwarding of the I/O request to a selected target.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
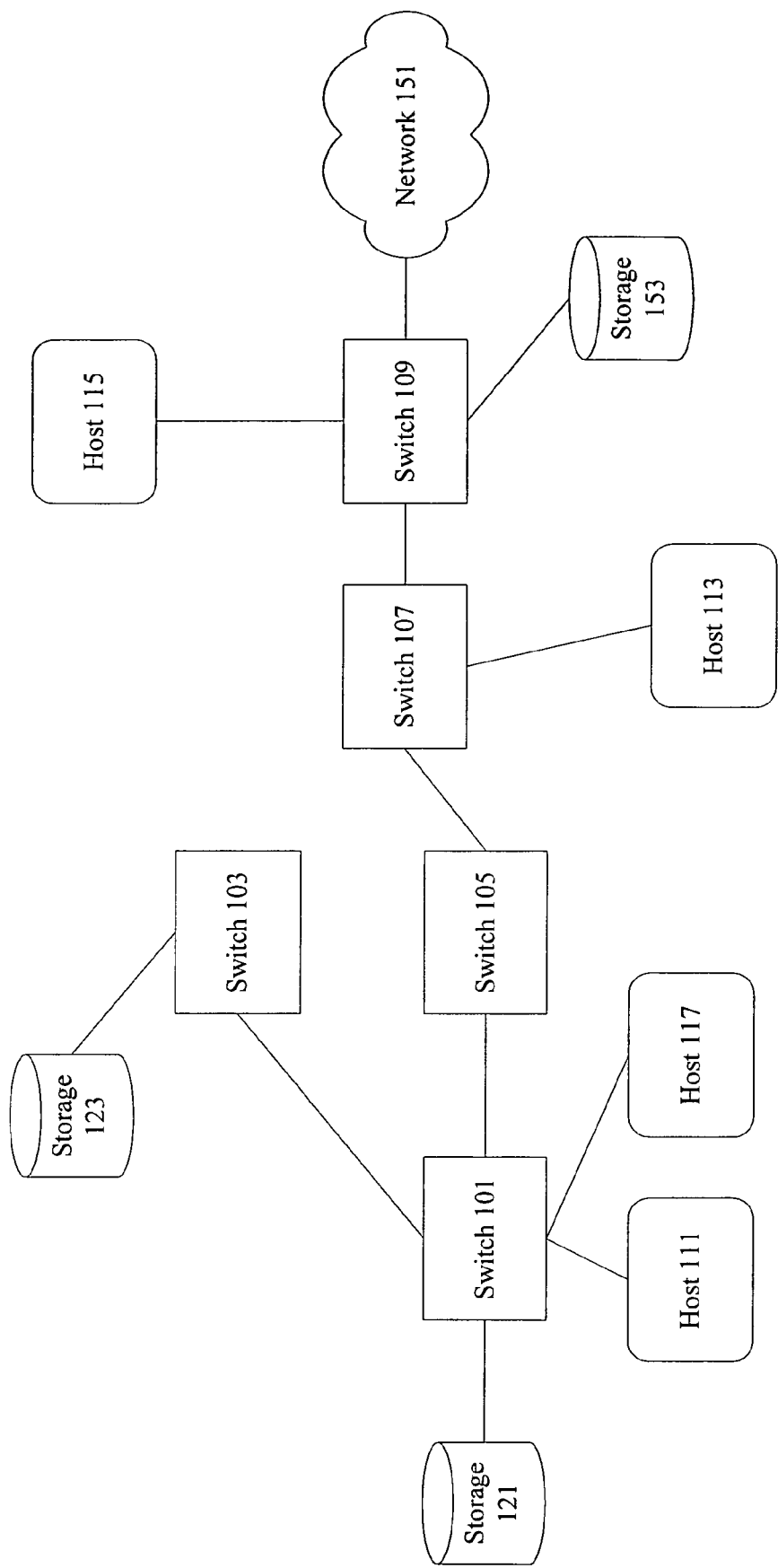
FIG. 1 is a diagrammatic representation showing a storage area network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Virtualization is an abstraction that allows efficient use of resources in a manner transparent to a user. In fibre channel networks, virtualization has conventionally been implemented at targets and at hosts. For example, a disk array would be responsible for striping and mirroring data across multiple disks. In another example, a host would provide for volume management and convert a single input/output (I/O) request into one or more requests for mirroring and striping to multiple disks.

Typical virtualization schemes such as those implemented at a host or at a target allow a controller to stripe and mirror data across multiple disks based on physical media characteristics such as disk speed and physical media size. However, host based and target based virtualization schemes may be expensive, inefficient, and may not use all available resources in a storage area network. Network based virtualization increases efficiency and allows implementation of virtualization in a manner transparent to both hosts and targets. A host makes an I/O request to a target and one or more virtualization engines in a network automatically perform mirroring, striping, and address mapping to allow data to be stored and retrieved from multiple targets.

A storage area network uses logical unit numbers (LUNs) to distinguish between storage resources. For example, users can determine whether a LUN is a disk drive, a number of disk drives, or a partition on a disk drive. Virtual logical unit numbers (VLUNs) allow more efficient organization of storage resources. Any set of resources used for storage in a storage area network is referred to herein as storage resources. According to various embodiments, storage resources include disk drives, portions of disk drives, or a partition of some physical storage media. In one example, storage resources are VLUNs. For example, a VLUN can be made up of complex Redundant Array of Independent Disks (RAID) layouts and even span across heterogeneous storage. VLUNs provide a convenient mechanism for more efficiently and intelligently allocating storage in order to increase data availability and data access performance.

According to various embodiments, storage resources associated with VLUNs are exposed to hosts by using virtual enclosure ports (VIRTUAL ENCLOSURE PORTs). Hosts continue to make I/O requests as though they have a direct connection to physical disks. Targets such as disk arrays respond as though they have direct connections to hosts. It should be noted that a direct connection may include intervening routers and switches. The targets seen by hosts and the hosts seen by targets are virtual entities. The virtual to physical (V2P) mapping, mirroring, and striping are performed at virtual engines included in a network virtualization scheme.

According to various embodiments, virtualization for a particular VLUN is controlled by a virtualization engine implemented by a processor in a fibre channel switch. In one embodiment, a virtualization engine includes multiple data path processors and associated resources in a fibre channel switch line card. The virtualization engine is responsible for handling transactions associated with a VLUN, including task management, data interlock, and virtual to physical lookup. In many instances, a virtualization engine handles transactions associated with multiple VLUNs.

If the volume of transactions on a particular VLUN becomes significant, a virtualization engine may get overburdened. Disk accesses would then be slowed not because of bottleneck issues at storage resources but because of bottleneck issues at a virtualization engine. In one instance, if a bulk back up of data is being performed on a particular VLUN, buffer, memory, processor bandwidth, and TCAM resources are quickly consumed and the virtualization engine can no longer handle I/O operations for other I/O accesses. Consequently, the virtualization engines themselves become a bottleneck. One solution is to add additional virtualization engines into a storage area network. However, adding additional virtualization engines in a storage area network requires reconfiguration of hosts and targets. Reconfiguration can disrupt storage area network performance.

Consequently, the techniques and mechanisms of the present invention provide virtualization engines that are separated into front end virtualization engines and back end virtualization engines. According to various embodiments, a front end virtualization engine performs light processing tasks such as task management and interlock. The front end virtualization engine can then select a back end virtualization engine to perform the more resource intensive task of virtual to physical address mapping. The front end virtualization engine can select a back end virtualization engine based on load-balancing factors. In some examples, a back end virtualization engine is selected on a VLUN or exchange basis. In other examples, a back end virtualization engine is selected based on determining the fastest response time.

Back end virtualization engines can be grouped as back end virtualization engine clusters to allow dynamic scaling of back end virtualization engine resources. Additional virtualization engines can be added and shared to perform virtualization processing transparently without any host or target level reconfiguration. Back end virtualization engine resources become highly available in a cluster configuration. Interlock can also be performed without the need for additional protocols. Multipathing can also be supported using front end virtualization engines and back end virtualization engines.

FIG. 1 is a diagrammatic representation of one example of a network that can use the techniques and mechanisms of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-ports. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

Figure 2:
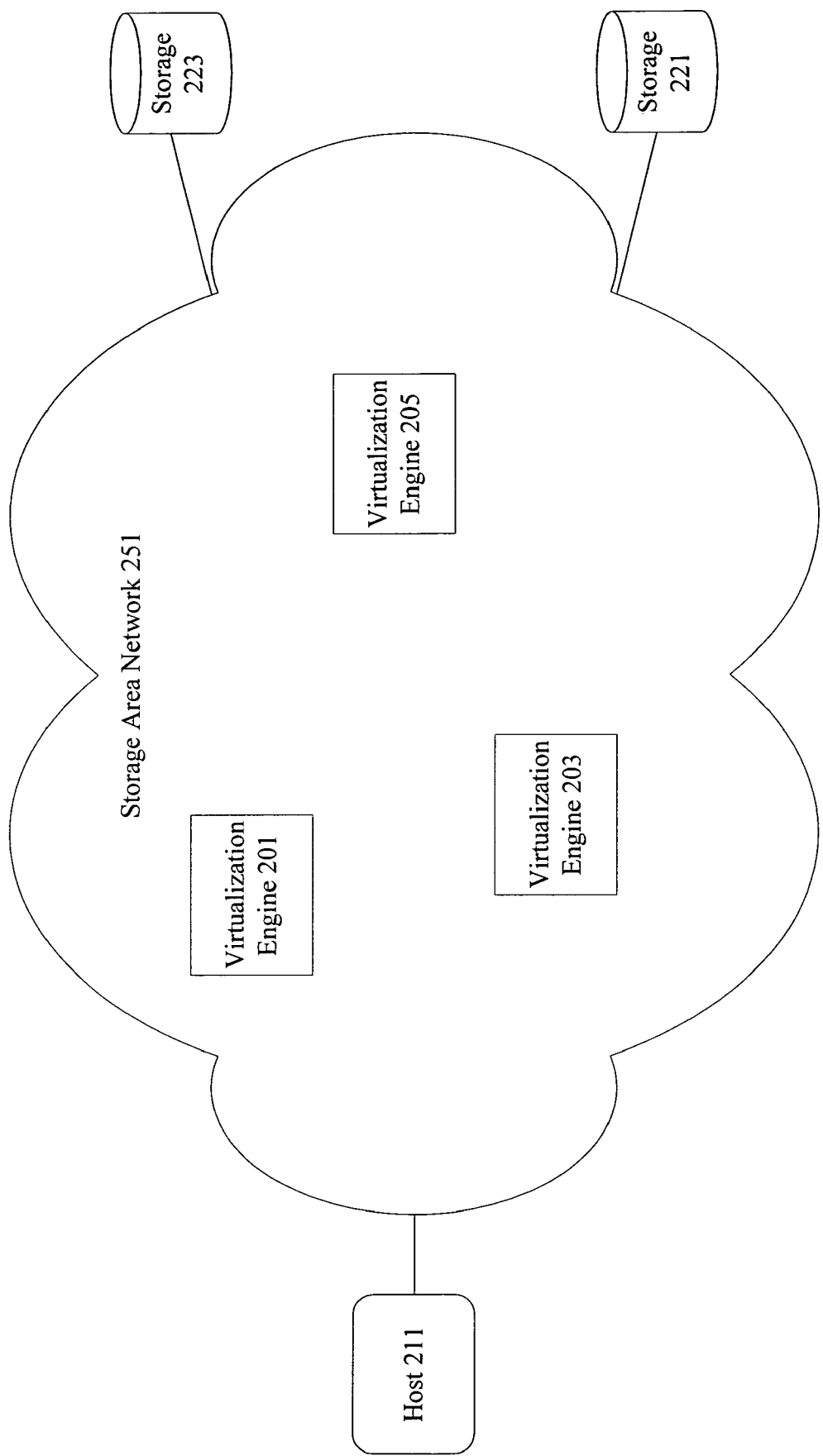
FIG. 2 is a diagrammatic representation showing a storage area network with multiple virtualization engines.

FIG. 2 is a diagrammatic representation showing a storage area network including multiple virtualization engines. A storage area network 251 includes virtualization engines 201, 203, and 205. A host 211 is connected to the storage area network 251. Storage devices 223 and 221 are also connected to the storage area network 251. According to various embodiments, a host 211 sends I/O requests that are handled by a particular virtualization engine such as virtualization engine 201. According to various embodiments, a host 211 sending a request to the virtualization engine 201 results in a virtualization engine 201 mirroring and striping a request to multiple storage resources, such as storage 223 and storage 221. Storage resources may be presented to a host 211 through a virtualization engine 201 by using VLUN or virtual enclosure ports (VEPs).

The virtualization engine 201 performs functions such as task management, interlock, virtual to physical (V2P) lookup, and also handles multipathing. Task management involves identifying tags associated with I/O requests to determine the type of task, such as simple tasks, high priority tasks, and ordered tasks. Data interlock allows the maintainence of data coherence at storage resources. V2P lookup maps virtual address ranges to physical address ranges. In one example, a virtual address range would be mapped to multiple physical address ranges to allow for mirroring. A virtual address range may also be split into multiple physical address ranges associated with multiple disks in order to allow striping. Multipathing involves handling multiple port accesses to the same VLUN. A virtualization engine 201 may be implemented using an intelligent linecard that includes datapath processors, cache, memory, and lookup tables.

Figure 3:
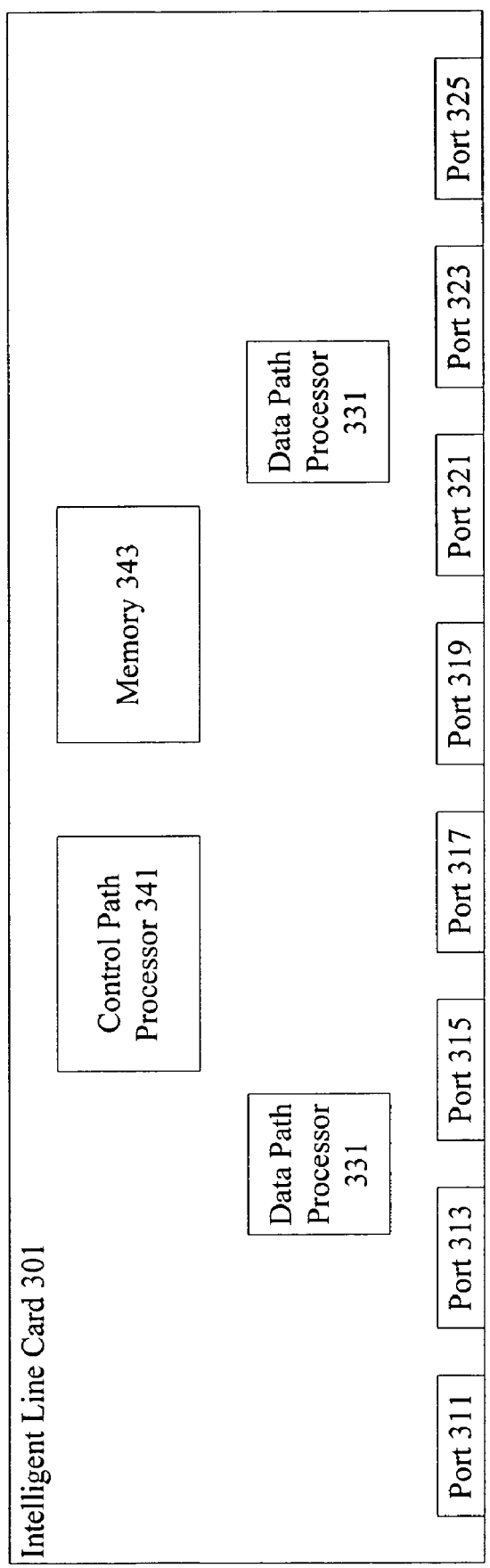
FIG. 3 is a diagrammatic representation showing an intelligent line card.

FIG. 3 is a diagrammatic representation of one example of an intelligent line card. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

According to various embodiments, each data path processor operates as a virtualization engine in charge of one or more VLUNs. In one example, a data path processor 331 may be overloaded with operations associated with a first VLUN and may neglect transactions associated with a second VLUN. In order to handle the overload, more virtualization engines are provided. However, adding virtualization engine conventionally requires reconfiguration of a storage area network and can be highly disrputive. Additional intelligent line cards at a particular fibre channel switch may also have to be added.

Figure 4:
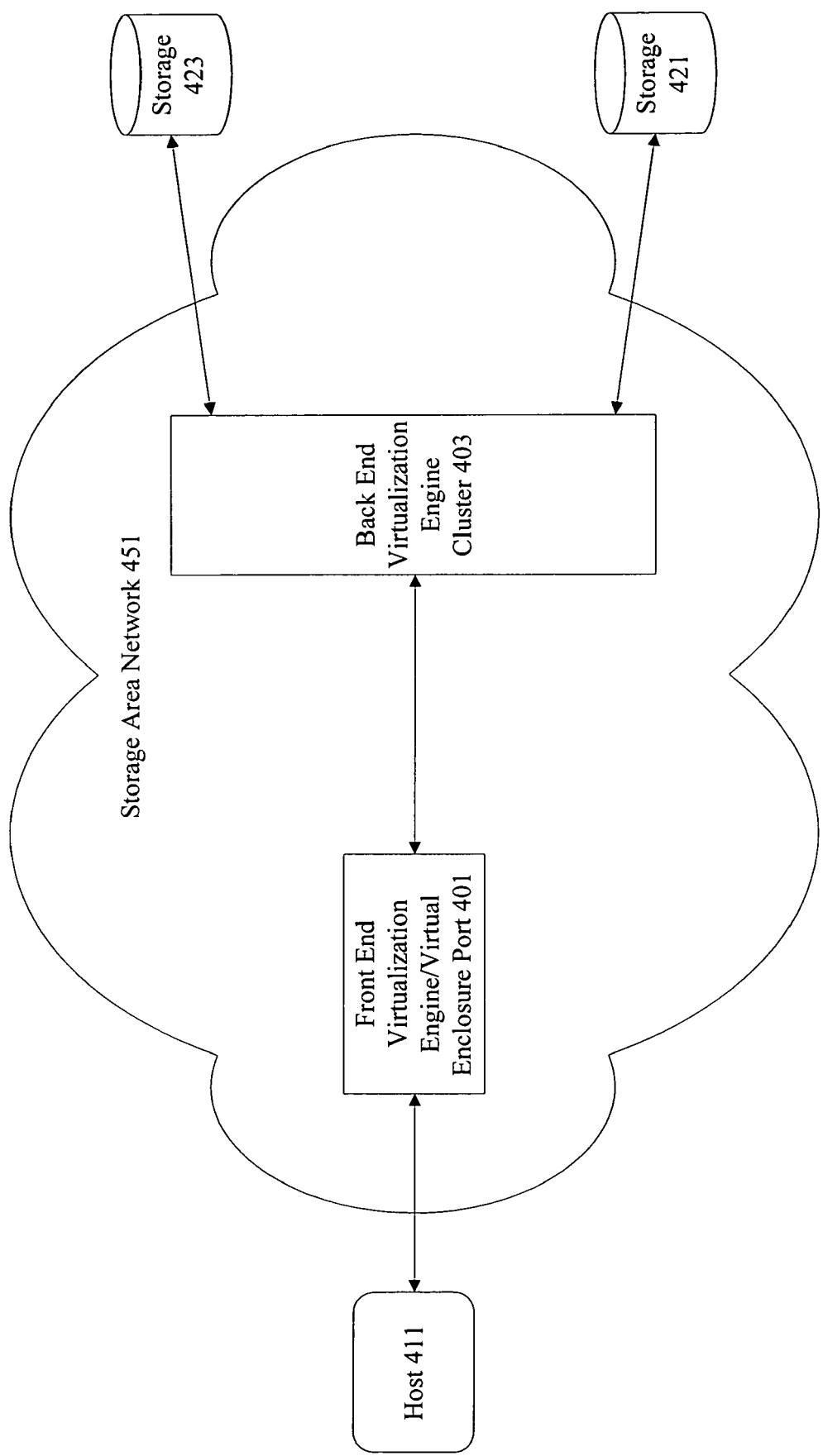
FIG. 4 is a diagrammatic representation depicting a storage area network having a front end virtualization engine and a back end virtualization engine cluster.

FIG. 4 is a diagrammatic representation showing one example of a mechanisms for separating a network virtualization engine into a front end virtualization engine and a back end virtualization engine. A storage area network 451 includes a front end virtualization engine and virtual enclosure port 401. In this embodiment, front end virtualization engine and virtual enclosure port functions are combined at a single entity. According to various embodiments, a front end virtualization engine and virtual enclosure port 401 is implemented using a data path processor in a line card associated with a fibre channel switch. The front end virtualization engine and virtual enclosure port 401 presents a unified and consistent interface to one or more hosts including host 411 to allow continuous network operation. In some embodiments, a front end virtualization engine and virtual enclosure port 401 performs less resource intensive operations such as task management and interlock. The front end virtualization engine and virtual enclosure port 401 also is configured to select a back end virtualization engine to perform additional virtualization processing.

According to various embodiments, the front end virtualization engine and virtual enclosure port 401 selects a back end virtualization engine from a back end virtualization engine cluster 403. The back end virtualization engine cluster 403 may include data path processors on the same line as the front end virtualization engine and virtual enclosure port 401. The back end virtualization engine cluster 403 may also include virtualization engines on other line cards or other fibre channel switches entirely. The back end virtualization engine cluster 403 is an abstract entity that can be dynamically configured and presented to a front end virtualization engine and virtual enclosure port 401. Additional virtualization engines can be added as needed and resources can be removed when no longer needed.

The back end virtualization engine cluster 403 allows dynamic configuration of virtualization engines for virtualization of storage resources such as storage 423 and 421. Additional virtualization engine resources can be provided for resource intensive operations such as V2P mapping. According to various embodiments, a front end virtualization engine and virtual enclosure port 401 selects a back end virtualization engine by selecting a virtualization engine with the lowest latency. In other examples, a virtualization engine is selected in a round robin or weighted round robin manner. Load balancing may be performed at a VLUN level for a more coarse approach, or load balancing may be performed at an exchange level for a more granular approach. In still other examples, a virtualization engine is selected from cluster 403 by determining the virtualization engine closest to a target, such as storage resource 421. Selecting a back end virtualization engine close to a target may be beneficial in certain storage applications in order to allow reduced latency between the back end virtualization engine and the target.

The virtualization engine itself becomes a resource that can be added and shared transparently. Virtualization engine resources become highly available by providing a back end virtualization engine cluster. Interlock can be accomplished transparently without the need for additional protocols.

In some embodiments, multiple virtual enclosure ports may be presented to hosts to allow hosts to access the same resources. According to various embodiments, each virtual enclosure port is instantiated on the port where the host is connected.

Figure 5:
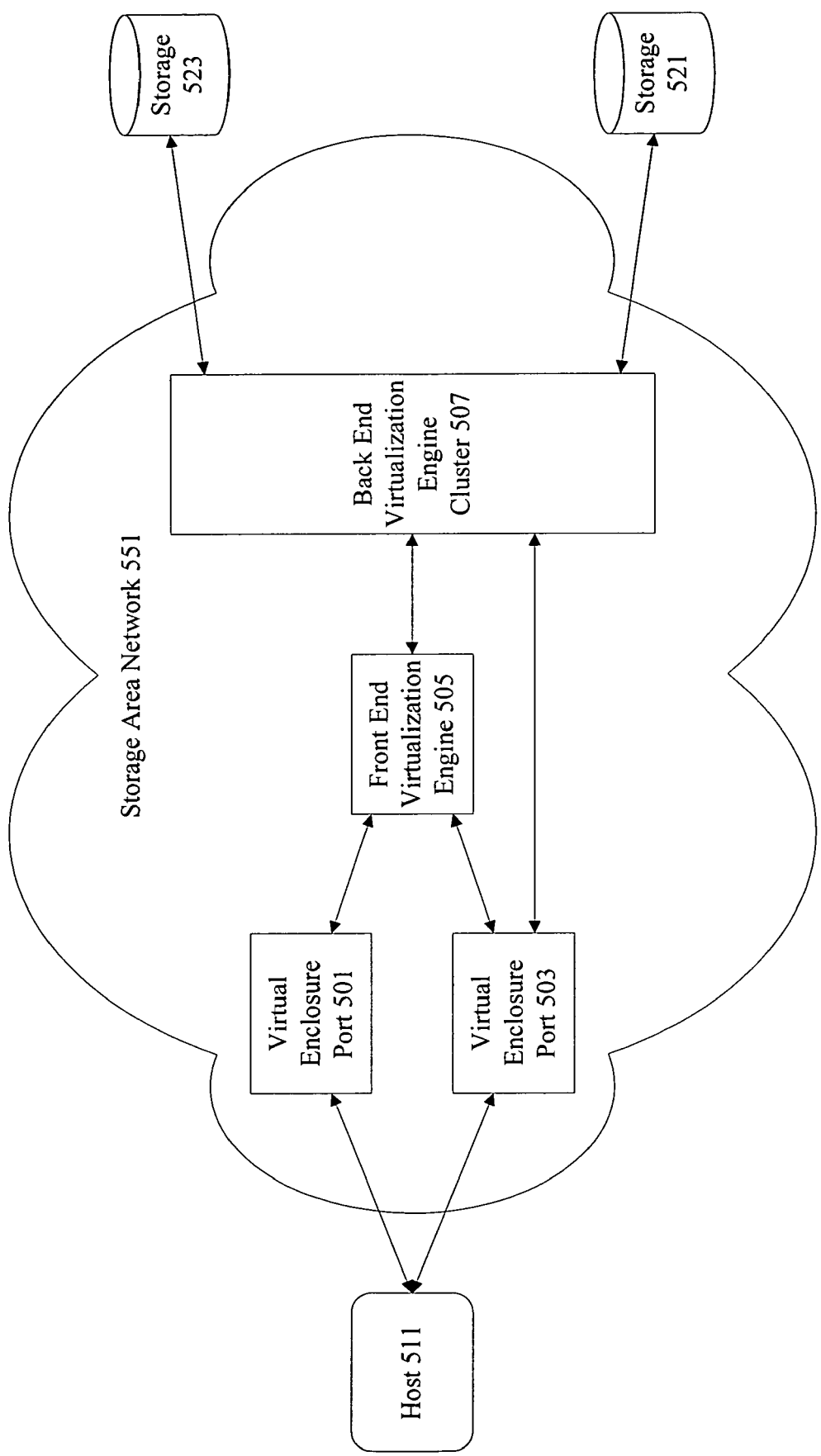
FIG. 5 is a diagrammatic representation showing a storage area network having a virtual enclosure port, a front end virtualization engine, and a back end virtualization engine cluster.

FIG. 5 is a diagrammatic representation showing multiple virtual enclosure ports. Multiple virtual enclosure ports 501 and 503 are presented to one or more hosts such as host 511. According to various embodiments, when multiple virtual enclosure ports 501 and 503 are presented, the virtual enclosure port functionality is separated from front end virtualization engine functionality. Consequently, the front end virtualization engine 505 continues to perform interlock and load balancing. However, the virtual enclosure ports 501 and 503 take over task management functionality. In one embodiment, all control and data frames go through front end virtualization engine 505 to one of the back end virtualization engines in back end virtualization engine cluster 507. If additional virtualization engine resources are needed, additional virtualization engines can be added to back end virtualization engine cluster 507 to allow access to storage 523 and 521 in a storage area network 551. However, the front end virtualization engine 505 may also become overloaded.

Consequently, the techniques and mechanisms of the present invention contemplate having the front end virtualization engine 505 handle command frames. Data frames however, are transmitted between a virtual enclosure port 503 and a back end virtualization engine cluster 507. The front end virtualization engine 505 is bypassed for data frames which are usually the bulk of the traffic. Consequently, a virtual enclosure port such as virtual enclosure port 503 directly sends I/O data to a back end virtualization engine. According to various embodiments, front end virtualization engine 505 communicates virtual enclosure port identity information (i.e. VSAN/FC-ID) to a selected back end virtualization engine in back end virtualization engine cluster using a fibre channel protocol command (FCP_CMND) frame.

The command frame allows the selected back end virtualization engine to set up an exchange entry to receive write I/O data directly from a virtual enclosure port such as virtual enclosure port 503. The front end virtualization engine 505 communicates selected back end virtualization engine identity information (i.e. VSAN/FC-ID) to a virtual enclosure port 503 using a fibre channel protocol transfer ready (FCP_X-FER_RDY) frame. The transfer ready frame allows the selected virtual enclosure port to communicate directly with the back end virtualization engine. In some examples, the front end virtualization engine creates interlock during the command phase and removes the interlock during the response phase, such as the fibre channel protocol response (FCP_RSP) phase.

Figure 6:
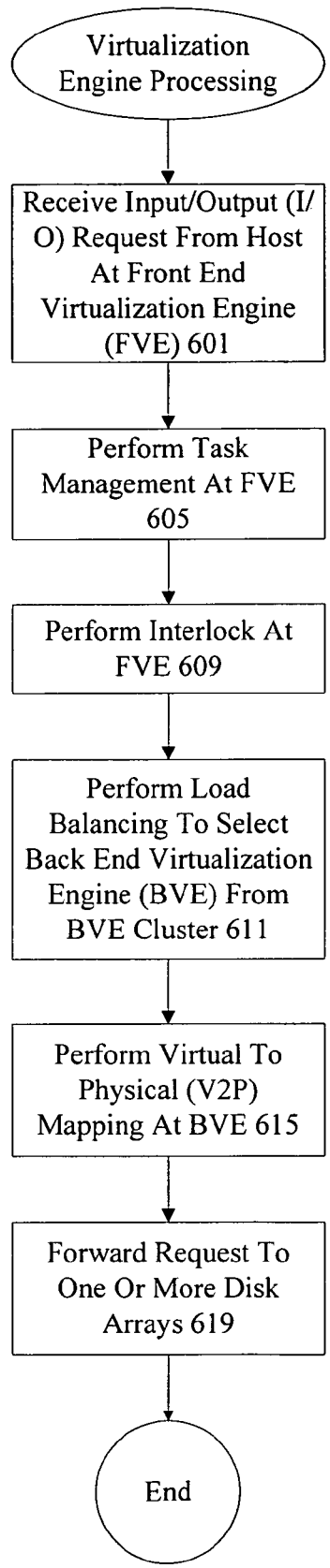
FIG. 6 is a flow process diagram showing virtualization engine load balancing with a single virtual enclosure port.

FIG. 6 is a flow process diagram showing virtualization engine processing where a single virtual enclosure port is presented to a host. At 601, an I/O request is received from a host at an front end virtualization engine. At 605, task management is performed at the front end virtualization engine. Various high priority tasks, low priority tasks, ordered tasks, and simple tasks may be classified by the front end virtualization engine at 605. At 609, interlock is performed. Performing interlock may involve adding an entry into an interlock table or checking for an entry in an interlock table. At 611, load balancing is performed to select a back end virtualization engine from a back end virtualization engine cluster. A back end virtualization engine may be selected by maintaining round trip times for various transactions with virtualization engines and determining the virtualization engine with the shortest round trip time. Different back end virtualization engines may be selected upon identifying different VLUNs or different exchanges.

At 615, virtual address to physical address mapping is performed at the back end virtualization engine. Based on the physical addresses determined, I/O transactions are forwarded to one or more disk arrays at 619.

According to various embodiments, virtualization can be further enhanced by using disk-path virtualization. In one embodiment, disk-path virtualization enhances read performance by allowing read aheads and enhances write performance by providing a caching facility. All multiple paths to a physical LUN can go through a single virtual target. Each virtual target becomes a front-end for a physical target. For every target that exists in a particular VSAN, a virtual target is instantiated as an N-port on one of the intelligent line cards. For those cases where multiple paths exist for the same physical LUN via multiple physical targets, the corresponding virtual targets are instantiated on the same N-port.

A virtualization engine is programmed to talk to virtual targets as though they are physical targets for performing physical LUN I/O operations. The virtual targets in turn perform actual I/O to physical LUNs after deploying the applicable multi-pathing algorithm, if necessary by creating a virtual target and instantiating the target as an N-port on one of the line cards. Since physical LUN I/Os to one or more multipathed physical LUNs can now be trapped via a virtual target, read aheads can be enhanced based on physical LUN access patterns to enhance read performance. Write performance can also be improved by implementing caching in virtual target N-ports.

Figure 7:
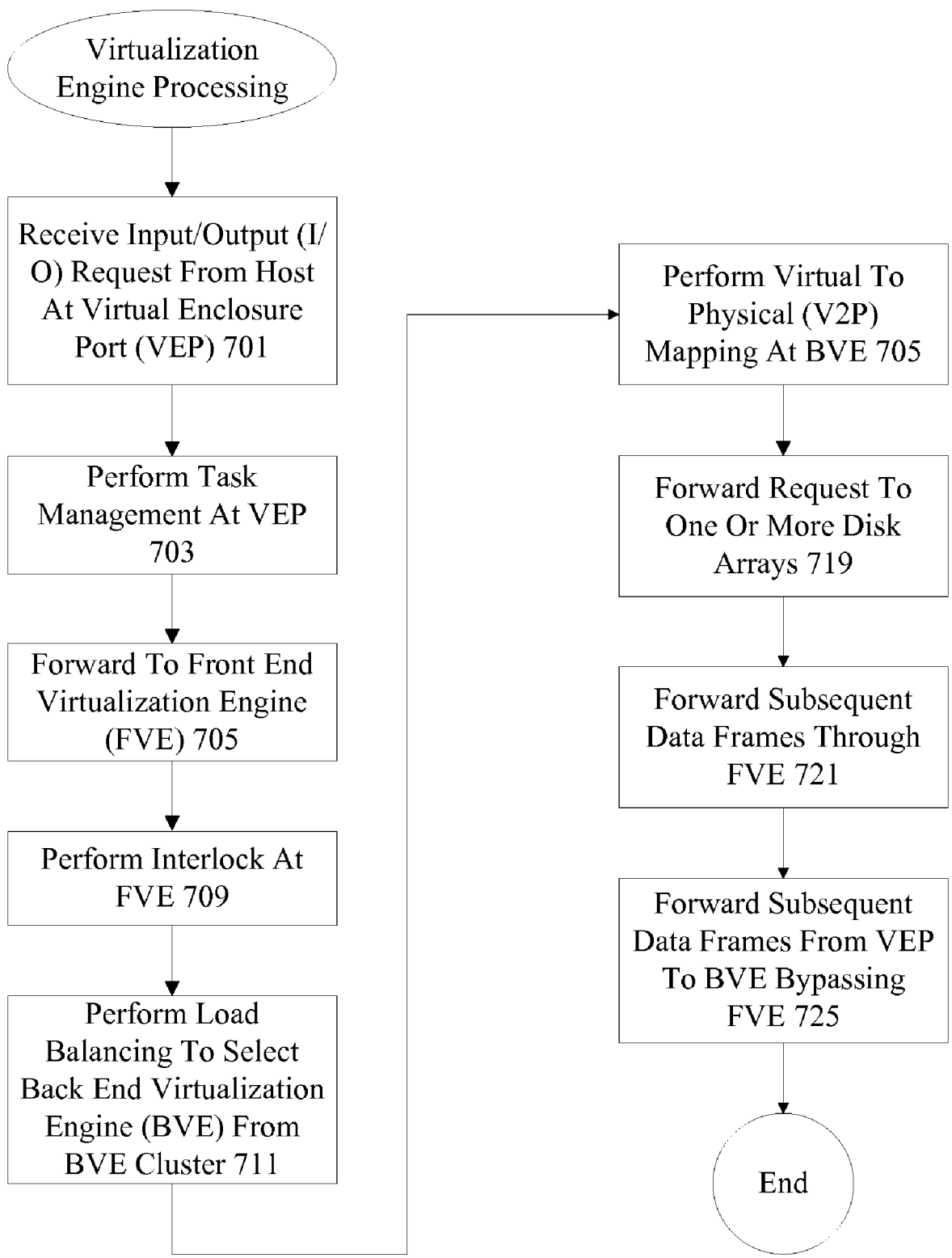
FIG. 7 is a flow process diagram showing virtualization engine load balancing with multiple virtual enclosure ports.

FIG. 7 is a flow process diagram showing virtualization engine processing where multiple virtual enclosure ports are presented to one or more hosts. At 701, an I/O request is received at a virtual enclosure port from a host. According to various embodiments, the I/O request is the first request associated with an exchange. At 703, task management is performed at the virtual enclosure port. At 705, the I/O request is forwarded to the front end virtualization engine. At 709, interlock is performed at the front end virtualization engine. Load balancing is performed to select a back end virtualization engine from a back end virtualization engine cluster at 711. At 705, virtual address to physical address mapping is performed at the back end virtualization engine. At 719, the request is forwarded to one or more disk arrays at 719. The front end virtualization engine distributes identification information to the selected back end virtualization engine and the virtual enclosure port to allow subsequent data frames to be transmitted from the virtual enclosure port to the back end virtualization engine. In some instances, data frames are transmitted directly. The front end virtualization engine is bypassed for data frames to prevent overload of the front end virtualization engine. Command frames are forwarded through the front end virtualization engine at 721. However, data frames bypass the front end virtualization engine at 725.

Figure 8:
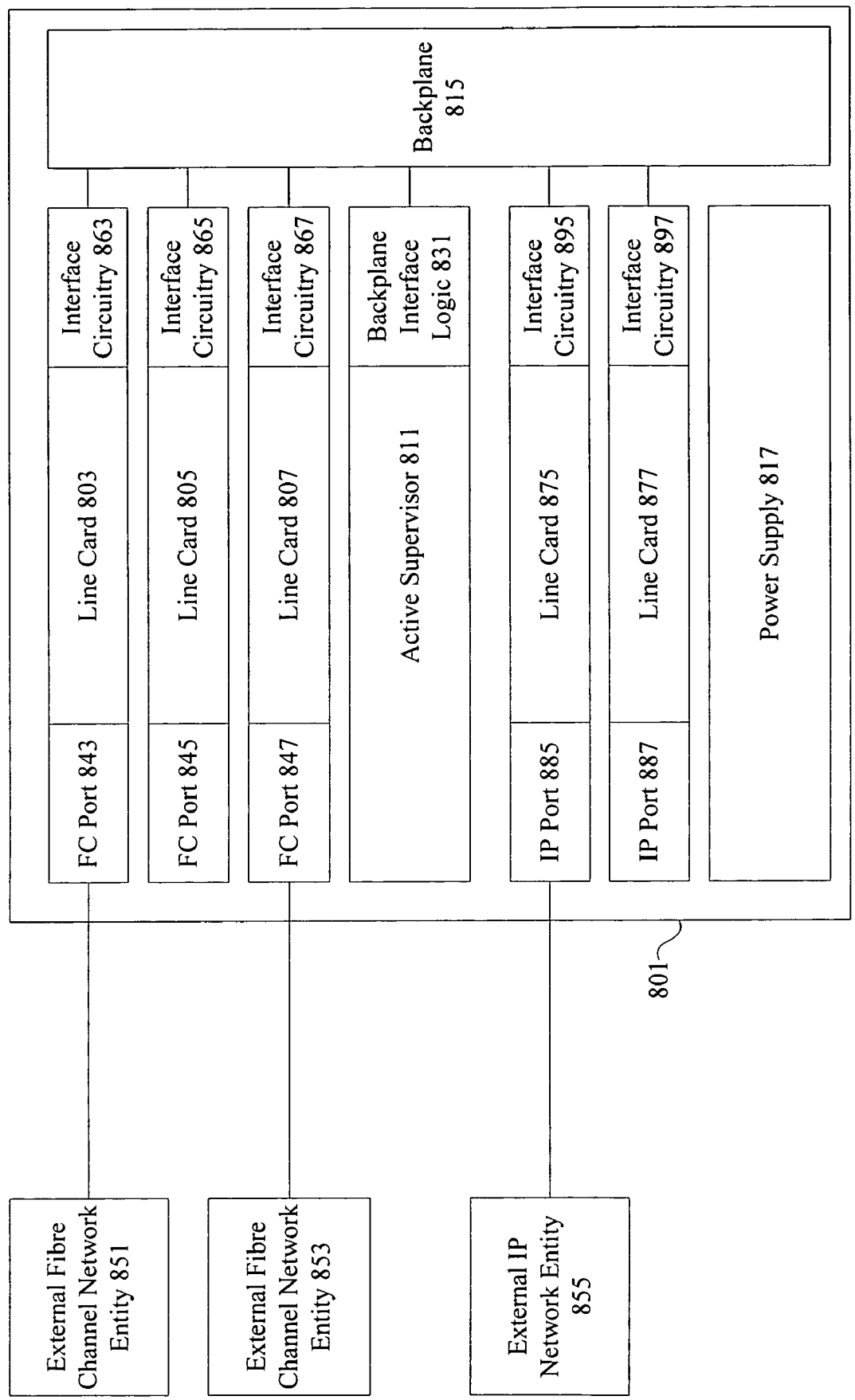
FIG. 8 is a diagrammatic representation showing a fibre channel switch.

FIG. 8 is a diagrammatic representation of one example of a fibre channel switch that can be used to implement techniques of the present invention. Although one particular configuration will be described, it should be noted that a wide variety of switch and router configurations are available. The tunneling switch 801 may include one or more supervisors 811. According to various embodiments, the supervisor 811 has its own processor, memory, and storage resources.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A virtualization engine in a network, comprising:
   a front end virtualization engine included in a first switch, the front end virtualization engine configured to receive an input/output (I/O) request from a host, perform interlock, select a back end virtualization engine, and send virtual enclosure port information corresponding to the host to the back end virtualization engine, wherein load balancing performed on a per exchange or per virtual logical unit number (VLUN) basis is used to select the back end virtualization engine to handle the I/O request;
   a back end virtualization engine cluster comprising a plurality of back end virtualization engines including the back end virtualization engine included in a second switch, wherein the back end virtualization engine is selected to perform a virtual to physical lookup for the I/O request to allow forwarding of the I/O request to a selected target;
   wherein a virtual enclosure port identified using virtual enclosure port information sends control frames to the front end virtualization engine but bypasses the front end virtualization engine when sending data frames to the back end virtualization engine.

2. The virtualization engine of claim 1, wherein the virtual to physical lookup maps a virtual address range to a physical address range.

3. The virtualization engine of claim 1, wherein the selected target comprises a plurality of disks in a storage area network.

4. The virtualization engine of claim 1, wherein the front end virtualization engine is a first data path processor included in a first intelligent line card in a first virtualization server.

5. The virtualization engine of claim 4, wherein the back end virtualization engine is a second data path processor included in the first intelligent line card in the first virtualization server.

6. The virtualization engine of claim 4, wherein the back end virtualization engine is a second data path processor included in a second intelligent line card in the first virtualization server.

7. The virtualization engine of claim 4, wherein the back end virtualization engine is a second data path processor included in a second intelligent line card in a second virtualization server.

8. The virtualization engine of claim 1, wherein the front end virtualization engine is configured to perform task management operations to determine the type of task associated with the I/O request.

9. The virtualization engine of claim 1, wherein types of tasks comprise simple tasks, ordered tasks, and high priority tasks.

10. The virtualization engine of claim 9, wherein the I/O request includes a tag indicating the type of task.

11. The virtualization engine of claim 1, wherein the front end virtualization engine is further configured to perform data interlock and load balancing.

12. The virtualization engine of claim 11, wherein data interlock is performed using an interlock database.

13. The virtualization engine of claim 12, wherein data interlock maintains data coherency at one or more disks in a storage area network.

14. The virtualization engine of claim 1, further comprising a virtual enclosure port, wherein the virtual enclosure port is configured to perform task management when multipathing allows a host access to a logical unit number (LUN) through multiple paths.

15. The virtualization engine of claim 14, wherein a front end virtualization engine performs data interlock and load balancing.

16. The virtualization engine of claim 15, wherein command frames from the host travel to the back end virtualization engine from the front end virtualization engine.

17. The virtualization engine of claim 15, wherein data frames from the host travel to the back end virtualization engine from the virtual enclosure port.

18. A method for performing network virtualization, the method comprising:
   receiving an input/output (I/O) request from a host at a front end virtualization engine comprising a processor, the front end virtualization engine included in a first switch in a network;
   performing interlock at the front end virtualization engine;
   selecting a back end virtualization engine from a back end virtualization engine cluster, wherein load balancing performed on a per exchange or per virtual logical unit number (VLUN) basis is used to select the back end virtualization engine to handle the I/O request, wherein the back end virtualization engine included in a second switch is selected to perform a virtual to physical lookup for the I/O request to allow forwarding of the I/O request to a selected target;

sending virtual enclosure port information corresponding to the host to the back end virtualization engine;

wherein a virtual enclosure port identified using virtual enclosure port information sends control frames to the front end virtualization but bypasses the front end virtualization engine when sending data frames to the back end virtualization engine.

19. The method of claim 18, wherein the virtual to physical lookup maps a virtual address range to a physical address range.

20. The method of claim 18, wherein the selected target comprises a plurality of disks in a storage area network.

21. The method of claim 18, wherein the front end virtualization engine is a first data path processor included in a first intelligent line card in a first virtualization server.

22. The method of claim 21, wherein the back end virtualization engine is a second data path processor included in the first intelligent line card in the first virtualization server.

23. The method of claim 21, wherein the back end virtualization engine is a second data path processor included in a second intelligent line card in the first virtualization server.

24. The method of claim 21, wherein the back end virtualization engine is a second data path processor included in a second intelligent line card in a second virtualization server.

25. A system for performing network virtualization, the system comprising:

means for receiving an input/output (I/O) request from a host at a front end virtualization engine comprising a processor, the front end virtualization engine included in a first switch in a network;

means for performing interlock at the front end virtualization engine;

means for selecting a back end virtualization engine from a back end virtualization engine cluster, wherein the back end virtualization engine included in a second switch is selected to perform a virtual to physical lookup for the I/O request to allow forwarding of the I/O request to a selected target, wherein load balancing performed on a per exchange or per virtual logical unit number (VLUN) basis is used to select the back end virtualization engine to handle the I/O request;

means for sending virtual enclosure port information corresponding to the host to the back end virtualization engine;

wherein a virtual enclosure port identified using virtual enclosure port information sends control frames to the front end virtualization but bypasses the front end virtualization engine when sending data frames to the back end virtualization engine.

26. The system of claim 25, wherein the virtual to physical lookup maps a virtual address range to a physical address range.

* * * * *